Oct. 4, 1960 R. E. SPITLER 2,955,167
DETACHABLE WIRE WIPER CORD HOLDER
Filed June 4, 1958
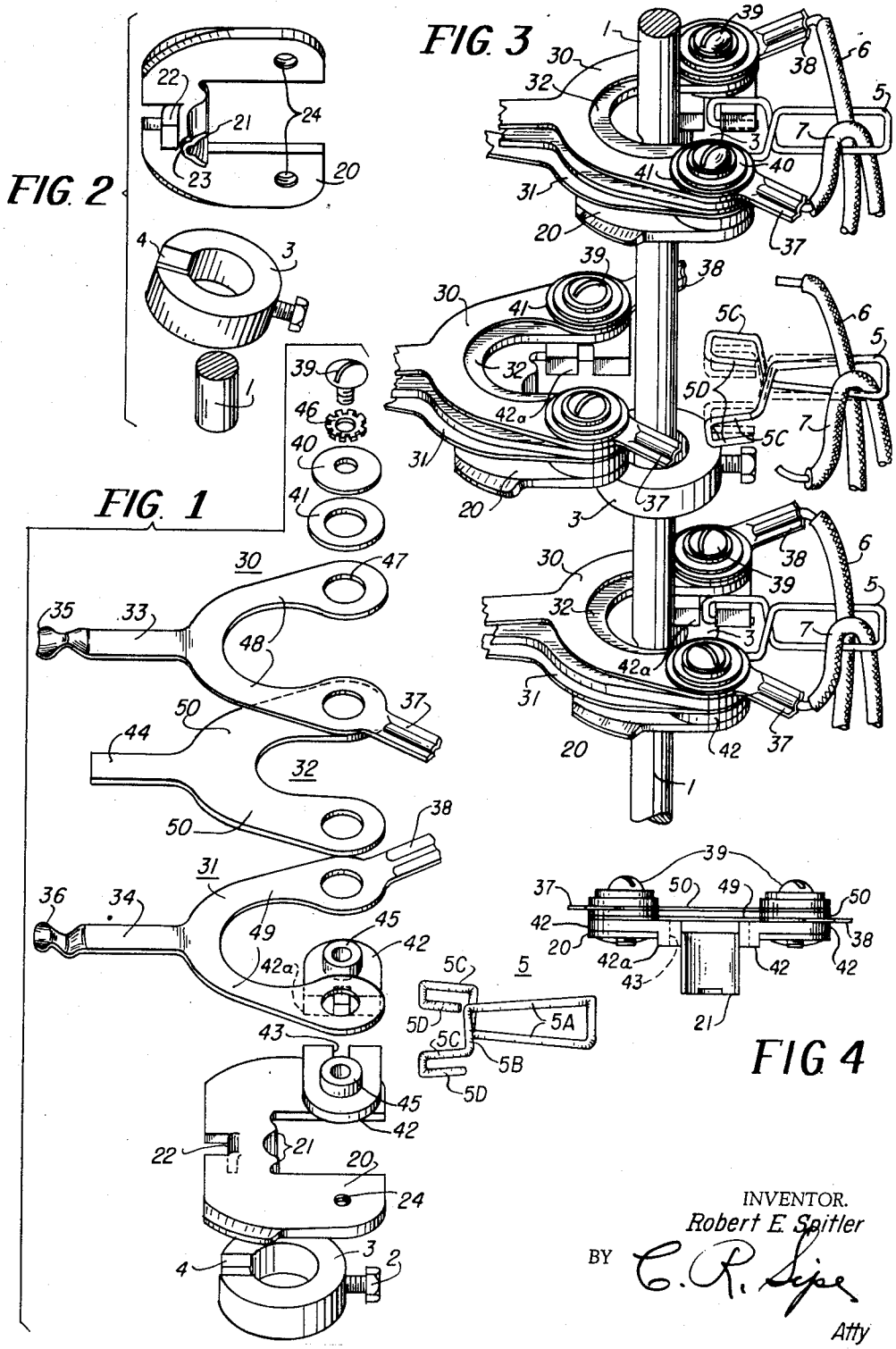
INVENTOR.
Robert E. Spitler
BY
Atty

United States Patent Office 2,955,167
Patented Oct. 4, 1960

2,955,167

DETACHABLE WIRE WIPER CORD HOLDER

Robert E. Spitler, Downers Grove, Ill., assignor to Automatic Electric Laboratories, Inc., a corporation of Delaware Filed June 4, 1958, Ser. No. 739,714

4 Claims. (Cl. 179—27)

This invention relates to electrical switching devices and particularly to improvements in switches used for the establishment of connections between subscribers' lines in automatic telephone systems.

Heretofore in automatic switches, particularly of the step-by-step or Strowger type having cord holders, wherein wiper cords are retained for being connected to wipers thereon, the holder and wiper assembly constitute one integral unit. This necessitated the removal of the wiper assembly from the shaft when worn out parts therein required replacement, and generally required the complete tearing down of the switch to accomplish this. It also necessitated the unsoldering of cords from the wiper terminals along the entire shaft. Although, certain improvements have been made in regards to this problem for detaching the cord holders, the manner for doing so generally required the removal of certain screws, or the unwrapping of a cord holder from its secured position which required undue manipulations. In the last mentioned case, the holders were generally no longer applicable for further usage.

The object of this invention is to simplify and improve from operation, installation and replacement standpoints, certain parts of automatic switching devices.

A further object of the present invention is to provide a wire wiper cord holder detachably secured to a wiper assembly, to not only permit detachment of said holder but to also permit the detachment of said wiper assembly.

A feature of the invention resides in a novel arrangement between a pair of insulation members having oppositely disposed notches, and a resilient wire wiper holder pre-tensioned at its extremities to engage between said notches.

A further feature of the invention resides in a wire wiper holder bent into a loop for accepting wiper cord connectors therethrough, and two outer hook-shaped extremities retroflective in respect to the loop for tensioning in opposite outer directions for stabile engagement between a pair of oppositely disposed insulation members.

The invention has been illustrated in the accompanying drawings in which:

Fig. 1 shows an exploded view of a wiper spring assembly, including a wire spring cord holder and securing means therefore.

Fig. 2 shows a perspective view of the wiper assembly and the interconnecting means for detachably securing the assembly to a shaft.

Fig. 3 shows a perspective view of a plurality of wiper assemblies, including the detachable cord holder, illustrating how it is attached and detached.

Fig. 4 shows a rear view of the wiper assembly, including the insulation member for attaching the cord holder thereto.

Referring now to Fig. 1, there is shown a complete wiper assembly in an exploded view in vertical alignment in which the compenent parts will be secured together. A "U-shaped" metallic plate 20 comprises the base for the wiper assembly, as well as the link for detachably securing the wiper assembly to the shaft 1.

Referring first to the wiper assembly itself, as shown in Fig. 1, a pair of flat wipers 30 and 31 made of any electrical conductive material and having substantially U-shaped portions 48 and 49 respectively, are separated by an insulater 32 having a substantially U-shaped portion 50. The wiper 30 has an upper arm 33 extending outward and forming a "V-shaped" wiper tip 35, and similarly wiper 31 has a lower arm 34 extending outward forming a "V-shaped" wiper tip 36. The wipers when assembled are pre-tensioned at the wiper tips toward each other. The wiper insulator 32 also has an arm 44 extending outward a short distance coextensive with the arms 33 and 34 to form an electrical insulation therebetween. A pair of insulator members 42, one for each end of the "U-shaped" portions of the wiper assembly are utilized for three purposes which will be explained in the ensuing description. The insulation members 42 have integral tubular projections 45 for accepting screws 39 therethrough. At the outer extensions of the wipers and the wiper insulator 32, are holes such as 47 for enveloping the tubular projections 45. For cooperation therewith are insulator washers 41 which rest upon the upper wiper 30. The tubular projections 45 insulate the screws 39 from the wipers to prevent short circuits. The plate 20 has a pair of threaded holes 24, for tightening the screws 39 therein after inserting the screws through lock washers 46, metal washers 40 and the tubular projections 45.

The "U-shaped" plate 20 at the inner intersection of its extending arms, has a lug projection 21 (Fig. 2) integral with and perpendicularly disposed relative to said plate. The lug 21 is semi-cylindrical in shape, and at its outer extremity has a neb integral with and substantially perpendicular with lug 21. Enveloping the shaft 1 is a hub 3, having a diameter larger than the diameter of the shaft to provide the clearance for lug 21 therebetween. By means of a set screw 2 in the hub 3, the wiper assembly, and more specifically the lug 21, is removably secured to the shaft 1. The distance along the outer edge of lug 21 between the plate 20 and the neb 23 is slightly longer than the thickness of hub 3, to permit a portion of hub 3 to rest therebetween. The plate 20 at the outer intersection of its extending arms, has an integral projection or tongue 22 perpendicularly disposed therefrom. For co-operation with the tongue 22 there is provided a groove 4 in the hub 3 to combine in a tongue and groove interconnecting arrangement.

Due to the "U-shape" of the wiper assembly, the assembly can be inserted or retracted from the shaft 1 through its open ends, as shown in Fig. 3. In attaching the wiper assembly to the shaft, the set screw 2 in hub 3 must be screwed outward from the shaft to permit the lug 21 of plate 20 to be inserted between the shaft 1 and the hub 3. After such insertion, the neb 23 engages the underside of hub 3 and the plate 20 will overlap a portion of the top of hub 3; the tongue 22 of plate 20 will interconnect within groove 4 of hub 3. After these last two manual operations, the set screw 2 will be tightened whereby it will engage shaft 1 and squeeze the lug 21 tightly between the shaft and the hub. The neb 23 will prevent longitudinal dislodgment of the wiper assembly, and the tongue and groove interlocking arrangement will prevent any rotary dislodgment after the wiper assembly has been secured to the shaft.

As mentioned, the insulation members 42 serve three purposes of which two have been disclosed, namely: (1) to insulate lower wiper 31 from the base plate 20 and (2) to insulate the component parts of the wiper assembly from the screws 39. By means of a pair of oppositely disposed notches 43, the insulation members serve to detachably secure a wire cord holder 5 therebetween while insulating the wire cord holder 5 from the plate 20. This last mentioned insulating is accomplished by a projection 42a which overlaps the inner extremities of plate 20, as shown in Fig. 4, whereby the cord holder 5 does not come in contact with the plate 20.

The wire wiper holder 5 is formed in a loop 5A for inserting cords therethrough such as 6 and 7, for being retained away from the movements of the switch to prevent interference in the operations thereof. The free ends of the cords are soldered to the wiper terminals 37 and 38 for electrical connections therebetween. The outer extremities 5C of the wire holder 5 are retroflectively bent in respect to the loop 5A, or, in other words, overlapping at the section 5B to pre-tension the outer extremities 5C in directions oppositely away from each other. The outer extremities 5C are formed into hook-shaped members 5D for overlapping the thickness of insulation members 42. The outer extremities 5C are manually squeezed toward each other and fitted between the oppositely disposed notches 43, and released to tension against the notches. The hook-shaped members 5D as mentioned, overlap a portion of the thickness of projection 42a of insulation member 42 to stabilize the wire holder 5 in a detachable position parallel with the insulation member 42. The wire cord holder 5 thus cooperates with the U-shaped wiper assembly to complete a closed detachable unit around the shaft 1.

It thus becomes apparent that a wiper assembly because of a wire cord holder, as herein shown, is detachable without necessitating the removal of other assemblies or cord holders along the shaft by virtue of the arrangement disclosed.

It will readily be appreciated by those skilled in the art that wiper assemblies embodying the improved cord holder disclosed herein will lend operating, installation, and maintenance advantages to the switches to which they are applied.

The detachable wiper assembly arrangement disclosed herein is claimed in the copending application of F. Gienger et al., Serial No. 739,078, filed June 2, 1958, now U.S. Patent Number 2,890,316.

What is claimed is:

1. In a cord holder for a switch, a shaft, a substantially "U-shaped" wiper assembly detachably secured to said shaft and removable through its open end, a pair of insulation members with one of each secured to the outer ends of said wiper assembly, a notch in each of said insulation members oppositely disposed from each other, a resilient wire formed into a loop with overlapping portions having free outer extremities, said wire pre-tensioned at said outer extremities in directions opposite to each other to provide resilient positioning thereof between said notches, said "U-shaped" assembly and said cord holder cooperatively forming a closed detachable unit around said shaft.

2. In a switch, a shaft, a wiper assembly detachably secured to said shaft, said wiper assembly including a pair of insulation members independently secured thereto in opposed relationship, said insulation members having notches oppositely disposed from each other, a resilient wire formed into a loop and having overlapping portions and free outer extremities adapted to engage said notches, said wire being pre-tensioned at said outer extremities in directions opposite to each other to positively position said loop between said insulation members, said wire and said insulation members cooperatively disposed to provide a detachable cord holder to permit the detachment of said wiper assembly from shaft.

3. In a switch, a shaft, a wiper assembly detachably secured to said shaft and having opposite arms forming an open end larger than the diameter of said shaft, said wiper assembly including a pair of terminal tabs secured one to the outer extremity of each arm, a pair of insulation members with one each secured on said opposite arms inside of said terminal tabs, said insulation members having notches oppositely disposed from each other, a resilient wire formed into a loop for retaining wiper connectable cords, said cord holder having two outer hook-shaped extremities retroflectively tensioned in respect to said loop to spread said extremities in directions opposite to each other to detachably engage said cord holder between said notches of said insulation members.

4. In a wiper assembly for a switch shaft for attaching a wiper cord to each wiper in said assembly, a cord holder for confining said wiper cords therein, said cord holder comprising a spring wire formed in a substantially rectangular loop by resiliently overlapping intermediate portions of said wire and formed hook-shaped portions on both ends of said wire with the hook-shaped portions being formed at approximately right angles to said rectangular loop portions, said wire being tensioned outwardly to separate said hook-shaped portions a predetermined distance, a pair of insulators in said assembly individually insulating said wipers, and notches in said pair of insulators separated a lesser distance than said predetermined distance engaged by said hook-shaped portions of said cord holder for detachably mounting said holder to said assembly.

References Cited in the file of this patent

UNITED STATES PATENTS

| | | |
|---|---|---|
| 2,259,103 | Drake | Oct. 14, 1941 |
| 2,457,588 | Miller | Dec. 28, 1948 |
| 2,890,316 | Gienger et al. | June 9, 1959 |